US010214359B2

(12) United States Patent
Ramachandra et al.

(10) Patent No.: US 10,214,359 B2
(45) Date of Patent: Feb. 26, 2019

(54) CONVEYOR BELT CONNECTOR AND METHOD FOR FORMING A BELT (71) Applicant: Fenner U.S., Inc., Manheim, PA (US)

(72) Inventors: Sunil Ramachandra, Lancaster, PA (US); Stephen F. Heston, Longmont, CO (US); Brian M. Pursel, Lancaster, PA (US)

(73) Assignee: FENNER U.S., INC., Manheim, PA (US)

( * ) Notice: Subject to any disclaimer, the term of this patent is extended or adjusted under 35 U.S.C. 154(b) by 0 days.

(21) Appl. No.: 15/445,341

(22) Filed: Feb. 28, 2017

(65) Prior Publication Data

US 2017/0247189 A1 Aug. 31, 2017

Related U.S. Application Data (60) Provisional application No. 62/301,263, filed on Feb. 29, 2016.

(51) Int. Cl.
*B65G 15/32* (2006.01)
*B65G 17/00* (2006.01)
(Continued)

(52) U.S. Cl.
CPC ............. *B65G 15/32* (2013.01); *B65G 17/00* (2013.01); *F16G 1/14* (2013.01); *F16G 3/00* (2013.01); *F16G 3/08* (2013.01)

(58) Field of Classification Search
CPC ............. Y10T 24/1624; Y10T 24/1676; B29C 66/4324; F16G 3/00; B65G 15/30
(Continued)

(56) References Cited

U.S. PATENT DOCUMENTS 311,883 A 2/1885 England
2,605,523 A * 8/1952 Llewellyn ................ F16G 7/00
24/33 V
(Continued)

FOREIGN PATENT DOCUMENTS

DE 203 17 186 4/2005
EP 2738418 6/2014
(Continued)

OTHER PUBLICATIONS

International Search Report issued in PCT/US17/19968 dated May 31, 2017.

*Primary Examiner* — James R Bidwell
(74) *Attorney, Agent, or Firm* — Stephen H. Eland; Dann, Dorfman, Herrell & Skillman (57) ABSTRACT A belt and belt connector is provided for forming a continuous belt loop. The belt connector includes a first element insertable into a first end of the belt and a second element insertable into a second end of the belt. The first element may include exterior threads for positively engaging the interior of the belt. Additionally, the belt connector may include a connecting link that connects the first and second elements so that the first and second elements are pivotable relative to one another. Additionally, the connecting link may be configured to that the first element is pivotable relative to the connecting link about a first pivot axis and the connecting link may be pivotable relative to the second element about a second pivot axis that is transverse the first pivot axis.

26 Claims, 6 Drawing Sheets (51) Int. Cl.
*F16G 1/14* (2006.01)
*F16G 3/08* (2006.01)
*F16G 3/00* (2006.01)

(58) Field of Classification Search
USPC .................. 198/844.2; 24/33 V, 31 B, 31 C
See application file for complete search history.

(56) References Cited

U.S. PATENT DOCUMENTS

| | | | |
|---|---|---|---|
| 3,245,276 A | | 4/1966 | Wall |
| 3,281,906 A | * | 11/1966 | Rakel ...................... F16G 11/08 24/33 V |
| 3,922,759 A | | 12/1975 | Mabie |
| 4,336,021 A | * | 6/1982 | Haines ...................... F16G 3/07 24/31 B |
| 4,795,410 A | | 1/1989 | Alderfer |
| 4,798,569 A | * | 1/1989 | Alderfer ................... F16G 3/00 138/155 |
| 5,964,018 A | | 10/1999 | Moody |
| 6,250,178 B1 | | 6/2001 | Wehr |
| 2002/0198527 A1 | | 12/2002 | Muckter |
| 2004/0159760 A1 | | 8/2004 | Olive |
| 2007/0137632 A1 | | 6/2007 | Steiner et al. |
| 2014/0106918 A1 | | 4/2014 | Richter et al. |

FOREIGN PATENT DOCUMENTS

| | | |
|---|---|---|
| FR | 413530 | 8/1910 |
| GB | 657652 | 9/1951 |

* cited by examiner

CONVEYOR BELT CONNECTOR AND METHOD FOR FORMING A BELT

PRIORITY CLAIM

This application claims priority to U.S. Provisional appl. No. 62/301,263 filed Feb. 29, 2016. The entire disclosure of the foregoing application is hereby incorporated herein by reference.

FIELD OF THE INVENTION

This present invention relates to endless belts, such as conveyor belts. More specifically, the invention relates to connectors for endless belts.

BACKGROUND OF THE INVENTION

Continuous belts made of thermoplastic material, such as polyurethane, are used in a variety of conveyor applications. A common method for forming such belts is to heat fuse or weld the ends of a length of belting in order to form a continuous loop. However, it can take a substantial amount of time to prepare and weld a belt. In addition, after a belt is welded, there is a waiting time before the belt should be fully tensioned. Therefore, the welding process can create undue down time for machinery. To reduce down-time, a mechanical fastener may be used to connect the ends of the belt. However, such fasteners significantly limit the amount of tension that can be applied to the belt. Such fasteners also tend to creep during use, which frequently causes the connector to become detached.

SUMMARY OF THE INVENTION

In light of the shortcomings of the prior art, the present invention provides an improved belt connector and a belt having an improved connector.

According to a first aspect, the present invention provides an endless belt formed of an elongated length of belt having a first end having an opening and a second end having an opening. A belt connector is provided that is configured to connect the first end of belt material with the second end of the belt material to create a continuous loop. The belt connector comprises a first connector having an exterior surface configured to cooperate with an interior surface of the first end opening. The belt connector also includes a second connector having an exterior surface configured to cooperate with an interior surface of the second end opening. A connecting link connects the first connector with the second connector. Additionally, the connecting link is pivotable relative to the first connector about a first axis and the connecting link is pivotable relative to the second connector about a second axis that is transverse the first axis.

According to a second aspect, the present invention provides a belt connector for connecting the first end of a length of belt material with the second end of the length of belt material to create a continuous loop. The length of belt material has a first interior cavity at the first end and a second interior cavity at the second end. The belt connector includes a first connector having an exterior surface configured to cooperate with an interior surface of the first end cavity and a second connector having an exterior surface configured to cooperate with an interior surface of the second end cavity. A connecting link connects the first connector with the second connector. The connecting link is pivotable relative to the first connector about a first axis and the connecting link is pivotable relative to the second connector about a second axis that is transverse the first axis.

According to yet another aspect, the present invention provides a belt connector for connecting the first end of a length of belt material with the second end of the length of belt material to create a continuous loop. The length of belt material has a first interior cavity at the first end and a second interior cavity at the second end. The belt connector includes a first connector having an exterior surface configured to cooperate with an interior surface of the first end cavity and a second connector having an exterior surface configured to cooperate with an interior surface of the second end cavity. A connecting link connects the first connector with the second connector. The connecting link is pivotable relative to the first connector about a first axis and the connecting link is configured to interconnect the first and second connectors after the first connector is positioned in the first end cavity and the second connector is positioned in the second end cavity.

According to another aspect, the present invention provides a method for connecting a length of belt material using a belt connector having a first connector, second connector and connecting link connecting the first and second connectors to form a belt. The method may form an endless belt loop. The method includes the steps of inserting the first connector into a first cavity in a first end of the belt material and inserting the second connector into a second cavity in a second end of the belt material. The first connector is then immobilized relative to the second connector to impede relative motion of the first connector relative to the second connector after the steps of inserting the first connector and inserting the second connector. The method further includes the step of rotating the first and second connectors about an axis while the first connector is in the first cavity and the second connector is in the second cavity. The step of rotating the first and second connectors operates to connect the first and second ends of the belt material and draw together the first and second ends.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Referring now to the figures, wherein like elements are numbered alike throughout, an endless belt is designated 10. The belt 10 is formed of a length of belt material having two ends connected by a belt connector 30. The belt connector 30 connects the ends of the belt to form a continuous loop. The belt is configured to be entrained around a plurality of rotatable elements, such as rollers or pulleys. For instance, in the present instance, the belt is entrained around a plurality of pulleys or sheaves, and each pulley has a rotatable groove in which the belt rides.

The belt 10 may be formed of any of a variety of materials. For instance, the belt 10 is formed from an elongated length of belting material which may be any of a variety of materials, including elastomers, such as rubber, silicon or any of a variety of plastics, such as polyurethane. In the present instance, the belting material is a length of extruded polyurethane having a hardness of about 85 or 89 durometer on the Shore A hardness scale, such as the polyurethane belting sold under the brand name EAGLE Red 85 QC or Eagle Green 89 sold by Fenner Drives of Mannheim, Pa.

Figure 1:
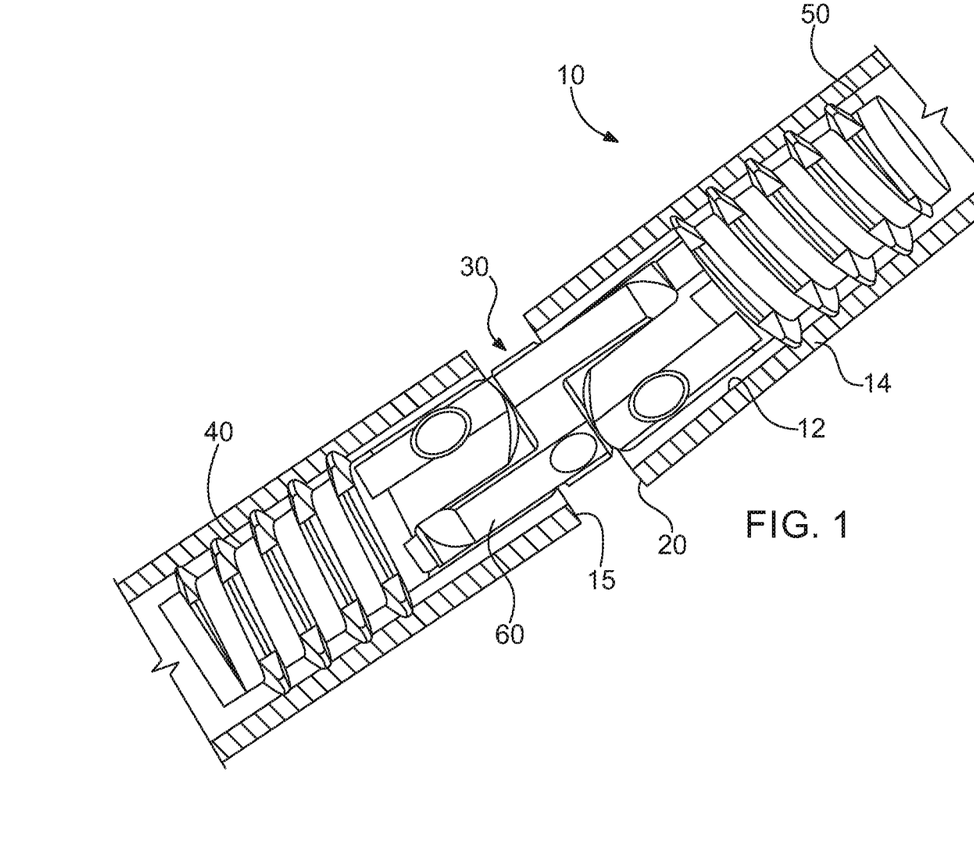
FIG. 1 is a fragmentary view of a belt and a belt connector.

The belt material may have any of a variety of cross-sectional profiles. For instance, as shown in FIG. 1, the belt may be a hollow generally cylindrical material having a circular cross-section. Alternatively, the belt material may be a v-belt having a trapezoidal cross-section in which the upper surface of the belt is generally flat having a first width and the inner surface of the belt is generally flat having a second width that is narrower than the first width. Alternatively, the belt material may have a pentagonal cross-section, such that the inner surface of the belt forms a flat surface that will ride in the groove of the pulleys and the outer surface forms a point or ridge rather than a flat surface, so that the outer surface forms a minimal point of contact with the items resting on the belt.

The connector is particularly suited for connecting belt material that has a hollow bore, however, solid belting material can be connected using one of the connectors if each end of the belt material is bored out to form a counterbore or socket for receiving the belt connector. Accordingly, in the following discussion in which the bore of the belt is mentioned, it should be understood that the bore may refer to a hollow bore belt having a bore that runs through the length of the material or the bore may refer to a counterbore or socket formed in the ends of the belt material.

Referring again to FIG. 1, in the present instance, the belt 10 is a hollow round belt having a circular cross-section. The belt has an inner bore 12 having a first diameter and an outer bore having a second diameter. The wall thickness may vary depending on the application. However, in the present instance, the wall thickness is approximately half the inner diameter. For example, one exemplary belt has an outer diameter of 3/16" and an inner diameter of approximately 0.080". However, it should be understood that the diameter of the belt may vary according to the application. Additionally, the belting may also be configured in metric sizes to operate in pulleys configured to receive metric sized belts. For instance, the belt may have a 10 mm outer diameter and an inner diameter of approximately 4.4 mm so that the thickness of the belt wall 14 is approximately 2.8 mm. Further exemplary belt sizes include 3/8", 1/2", 9/16" and 3/4" OD as well as metric sizes, including 12 mm, 15 mm and 18 mm OD.

The belt 10 has a first end 15 and a second end 20 remote from the first end. The belt connector 30 connects the first end 15 to the second end 20 to form a continuous loop. In FIG. 1, the first end 15 is shown as spaced apart from the second end 20 so that there is a gap between the two ends. However, it should be understood that the view in FIG. 1 illustrates the connector partially inserted into the ends of the belt. The connector is configured so that the ends 15, 20 of the belt 20 abut or nearly abut when the connector is fully inserted into the belt.

When the belt travels around a pulley, the belt connector 30 may form a rigid portion along the length of the belt. In other words, the connector will tend to make the portion of the belt adjacent the connector more rigid than the rest of the length of belt. To increase the flexibility of the belt at the joint (i.e., where ends 15 and 20 meet), the belt connector may facilitate movement about one or two axis. In particular, preferably the belt connector is formed of two halves, the first half being inserted into the first end 15 of the belt and the second half being inserted into the second end 20 of the belt. Preferably the first half is moveable relative to the second half. For instance, the first half may be pivotable about a first axis relative to the second half. Alternatively, the first half may be pivotable relative to the second half about a first axis and a second axis. Further still, the first half may be connected to the second half by a connection that permits three degrees of freedom, such as a universal joint connection.

Referring again to FIGS. 1-2, the belt connector 30 is configured to provide two degrees of freedom to improve the ability of the connector 30 to bend in the appropriate direction when the belt joint travels around a pulley or roller. The connector 30 includes first and second halves 40, 50 that are connected by a connecting link 60. The connecting link 60 is configured to permit relative motion between the first half 40 and the connecting link about a first axis of rotation. The connecting link is also configured to permit relative motion between the second half 50 and the connecting link 60 about a second axis that is transverse the first axis. In particular, the second axis is perpendicular to the first axis in the present instance.

Figure 2:
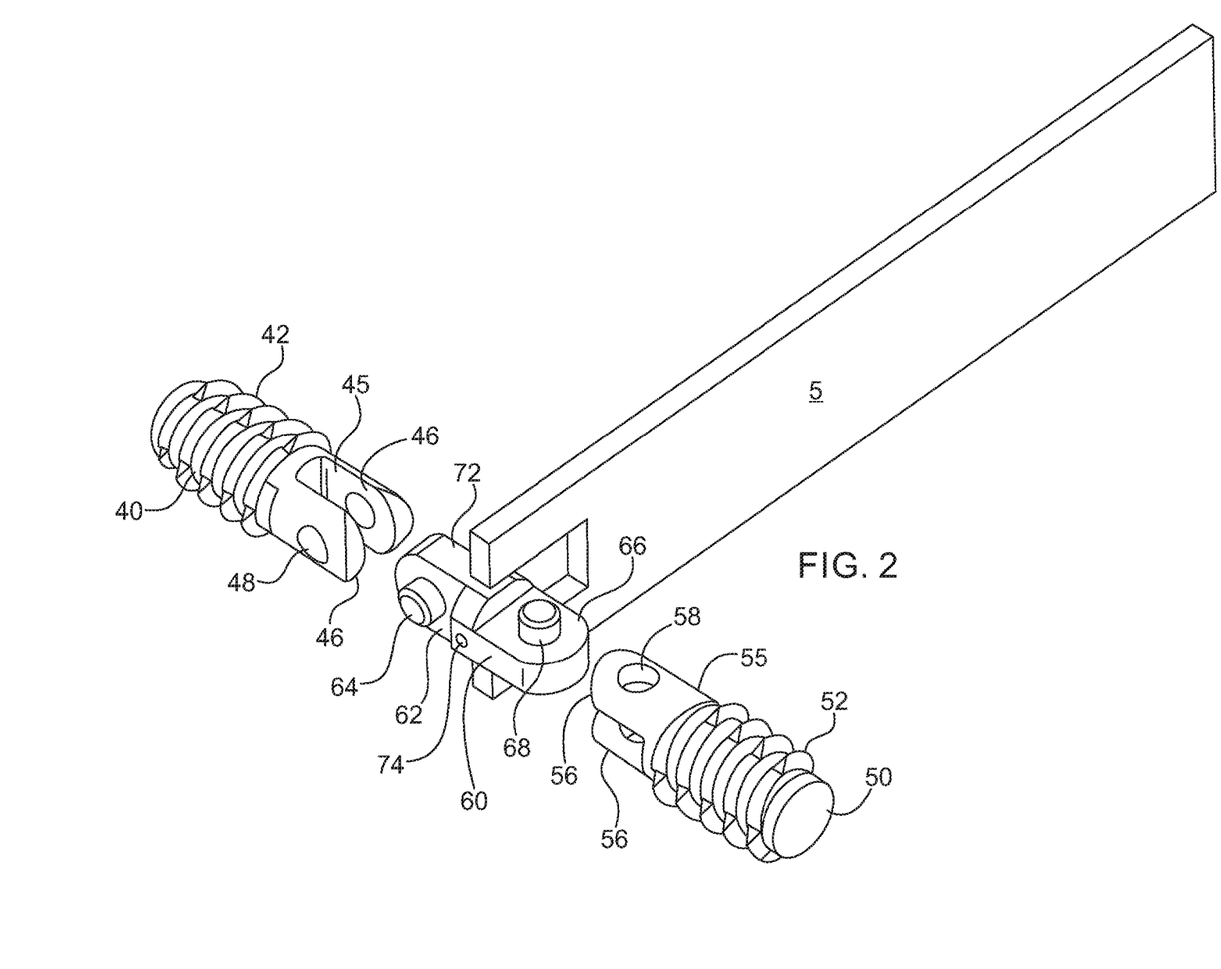
FIG. 2 is an exploded perspective view of the belt connector illustrated in FIG. 1.

Referring now to FIG. 2, the first half 40 of the belt connector 30 comprises a threaded plug configured to threadedly engage the interior wall 14 of the belt 10. The threads of the threaded portion 42 are formed so that the threads engage the wall of the belt material. In particular, the threads are configured to dig, cut or bite into the belt material to form a positive engagement between the threads 42 and the wall 14 of the belt. For this reason, the threads 42 of the first half may be formed as self-tapping threads. Specifically, the threads 42 may be tapered threads, so that the outer diameter of the lead threads is smaller than the outer diameter of the rear threads. In this way, the diameter of the threads taper along the axis of the first half 40 of the connector 30. The tapered forward end allows the first half 40 to more easily engage and self-center into the bore of the first end 15 of the belt. Furthermore, the threads may be continuous, but in the present instance a gap is cut or formed into the length of the threads, forming an axially extending flute or groove along the threads. Further still, the threads may be formed with a plurality of flutes spaced about the circumference of the threads. The edges of the threads adjacent the flutes are angled to form cutting edges so that the threads more easily cut or bite into the wall 14 of the belt material. In this way, the flutes in the threads operate similar to the flutes in a tap to facilitate the threads cutting into the belt.

The length of the threaded plug may vary based on the diameter of the belt. Generally speaking, the length of the threaded plug may increase as the diameter of the belt increases. For instance, for a 10 mm OD the threaded portion is approximately 0.267" long; the thread length may be approximately 0.320" for a 12 mm OD belt; the thread length may be approximately 0.400" for a 15 mm OD belt; and the thread length may be approximately 0.480" for an 18 mm OD belt.

As described above, the threads are configured to bite or cut into the wall 14 of the belt. Alternatively, the threads may be configured so that the threads simply deform the wall of the belt outwardly. The threads thus form bulges inside the bore 12 creating high-frictional resistance against being pulled out of the belt. Such threads may have a relatively wide land that impedes the thread from cutting or biting into the belt material. However, in the present instance, the threads are formed with a relatively high thread angle. The thread angle may be within a range that is greater than or equal to 30 degrees and less than or equal to 60 degrees. More specifically, the thread angle may be between 35 and 55 degrees. In particular, the thread angle may be between 40 and 50 degrees. Additionally, preferably the thread has a relatively coarse pitch. For instance, the pitch for a given connector diameter is preferably at least as coarse as a coarse pitch under the ISO or Unified Thread Standard for a thread diameter corresponding to the diameter of the threads 42 of the first half 40.

Further still, it should be understood that the thread profile of the threaded portion 42 may be formed according to any of a variety of thread profiles. For example, the threads 42 may be formed as v-threads, pipe threads or buttress threads. These thread profiles are merely exemplary profiles and it should be understood that the actual thread profile may vary. However, in the present instance, the thread profile is a v-shaped profile having a thread angle of approximately 40 degrees.

As shown in FIG. 2, the first half or first threaded plug 40 of the belt connector 30 includes a second end formed to connect with the connecting link 60 to provide a pivotable connection. In particular, the first threaded plug 40 includes a yoke 45. Specifically, the first threaded plug includes a pair of spaced uprights 46 spaced apart from one another so that a slot is formed between the two uprights, thereby forming the yoke 45. A socket or aperture 48 is formed in each upright 46 of the yoke 45. In the present instance, the sockets are holes or apertures extending through the thickness of each upright. Further still, the through holes 46 are aligned to form a pivot axis for the first threaded plug 40.

The first threaded plug 40 may also be formed so as to improve the engagement between the belt connector 30 and tools used during installation of the belt connector. For instance, one or more generally flat planar surfaces may be formed on the exterior surface of the first threaded plug. In particular, the flat surfaces may be spaced apart around the circumference of the first plug. In the present instance, a first flat extends along a length of the exterior surface of the first upright 46 and a second flat extends along a length of the exterior surface of the opposing upright 46. In this way, a pair of generally parallel flats are formed on the exterior surface of the first plug 40 and the flats are spaced apart approximately 180 degrees around the circumference of the first plug.

The belt connector includes a second threaded plug 50 configured substantially similarly to the first threaded plug described above. The second threaded plug 50 is configured to engage the hollow bore of the second end 20 of the belt 10. The second threaded plug 50 includes a threaded portion 52 at one end and a yoke 55 at the opposing end. The yoke 55 is formed of a pair of spaced apart uprights 56, with a slot formed between the uprights. A pair of socket 58 or holes extend through the uprights 56 and are aligned to form a pivot axis about which the second threaded plug is pivotable.

Additionally, similar to the first threaded plug 40, the second threaded plug 50 includes one or more flats 59 along the length of the exterior of the second plug. The flat aids in the engagement of the connector by an installation tool. In particular, in the present instance, the second threaded plug includes a pair of flats formed along the exterior surface of the uprights 56 so that the second plug includes a pair of flats spaced apart approximately 180 degrees around the circumference of the second plug so that the flats are generally parallel to one another. It should be noted that the flats may be omitted from the yokes of the threaded inserts to increase the strength of the yokes 45, 55. Instead (or in addition to), the flats may be formed on the connecting link 60 as discussed below.

Although the second threaded plug 50 is substantially similar to the first threaded plug 40, the second threaded plug has threads that are formed in the opposite hand of the threads of the first threaded plug. For instance, the first threaded plug 40 may have lefthand threads, whereas the second threaded plug may have righthand threads.

The first threaded plug 40 is connected with the second threaded plug 50 such that the first threaded plug 40 is pivotable about a first pivot axis and the second threaded plug 50 is pivotable about a second pivot axis that is transverse the first pivot axis. In particular, the first pivot axis may be perpendicular to the second pivot axis. In the present instance, a connecting link 60 interconnects the first threaded plug 40 with the second threaded plug 50 to provide pivoting motion about the first and second pivot axes.

The connecting link 60 comprises a first connecting end 62 adapted to connect with the yoke 45 of the first threaded plug 40. In particular, the first connecting end comprises a generally flat tongue 62 having a thickness less than the width of the slot formed between the two uprights 46 of the yoke 45. The end of the tongue 62 is curved or, more specifically, rounded, so as to provide clearance so that the tongue can pivot relative to the yoke 45 without the end of the tongue interfering with the bottom of the slot in the yoke 45, which would impede the pivoting of the connecting link relative to the first threaded plug.

A first connecting pin 64 projects upwardly from the upper surface of the tongue 62. The pin 64 is generally cylindrical and has a rounded or chamfered head to facilitate insertion of the pin into the yoke 45 of the first threaded plug. The pin 64 has a diameter that corresponds to the diameter of the sockets or holes 48 in the uprights 46 of the yoke 45. A second pin projects downwardly from the lower surface of the tongue 62. The second pin is axially aligned with the first pin 64, so that an axis extending through the first and second pins forms the pivot axis about which the first threaded plug pivots relative to the connecting link.

The connecting link 60 is pivotably connected with the threaded insert 40 by connecting the pins 64 of the connecting link with the yoke 45 of the threaded insert. The pins 64 have an interference fit with the yoke 45, so that pressing the connecting link into the slot of the yoke causes the uprights 46 to flex or deflect outwardly. To aid in the insertion of the pins 64 into the yoke, the ends of the uprights 46 are angled or chamfered. When the connecting link 60 is inserted into the yoke, the pins wedge the uprights outwardly until the pins are aligned with the apertures 48 in the uprights 46 at which point the uprights resiliently snap back inwardly thereby retaining the pins 64 in the apertures 48. The clearance between the pins 64 and the apertures 48 is a running fit to facilitate free pivoting motion between the connecting link 60 and the threaded insert 40. For instance, the fit may be a medium running fit or free running fit.

The connecting pin 60 includes a second tongue 66 configured substantially similarly to the first tongue 62, so that the second tongue is configured to cooperate with the yoke 55 of the second threaded plug 50. Additionally, like the first end of the connecting pin, the second end has a pair of cylindrical pins 68 that project from opposing sides of the tongue and are axially aligned to form a second pivot axis. The second tongue 66 is oriented at a different angle relative to the first tongue 62, so that the pivot axis defined by pins 68 is transverse pivot axis defined be pins 64 on the first tongue. In particular, the second tongue is perpendicular to the first tongue so that the second axis is perpendicular to the first axis.

The connecting link 60 may also be adapted for engagement with a tool for connecting the belt connector 30 with the belt 10. For instance, the outer surface of the connecting link may include flat surfaces 72 spaced apart about the circumference of the connecting link or on opposing sides of the connecting link to facilitate engagement between the connecting link and a tightening tool, such as a box wrench or similar tool. Similarly, a pair of slots may be formed on opposing sides of the connecting link. The slots have a width configured to receive the end of an open box wrench 5 as shown in FIG. 2. Alternatively, a cross-bore or through hole 74 may extend through the thickness of the connecting link as shown in FIG. 2. A separate tool in the form of an elongated cylindrical pin may be inserted through the through hole so that the belt connector 30 can be rotated relative to the belt by applying a turning force to the elongated pin, wherein the turning force is applied tangential to the end of the elongated pin.

Elements of the belt connector 30 can be formed of a variety of materials, including plastics or metals. In the present instance, the threaded inserts 40, 50 and the connecting link 60 are made of metal, such as steel. In the present instance, the elements are made of a hardened alloy steel.

Configured as described above, the belt connector 30 can be used to connect a length of belting to form a continuous belt 10. A length of belting is provided having a first end 15 and a second end 20. Each end 15, 20 has a hollow bore. The belt is clamped or otherwise retained adjacent the first end 15 to maintain the first end in a generally fixed orientation to impede axially displacement of the first end. For instance, a clamp may be applied to the belt a few inches from the first end 15 of the belt, wherein the clamp may clamp the belt to a stationary surface such as the work surface of a table, workbench or other surface.

After retaining the first end 15 of the belt, the second end 20 is aligned with the first end. The first threaded portion 40 of the connector is then clamped or held by a tool so as to impede the first threaded plug from pivoting relative to the connecting link 60. Additionally, the second threaded portion 50 may be clamped or held by a tool so as to impede the second threaded plug from pivoting relative to the connecting link. However, it may only be necessary to clamp or restrain one end of the connecting link so that the connecting link 60 is only constrained against pivoting about one of the first and second pivot axes. The first threaded plug 40 is inserted into the opening of the bore 12 in the first end 15 of the belt and the second end 20 of the belt is displaced or pressed toward the second threaded plug so that the second threaded plug is inserted into the opening of the bore of the second end. The belt connector 30 is then rotated relative to the belt around the axis of the belt 10. Rotating the belt connector 30 causes the threaded portion 42 of the first threaded plug to thread into the wall 14 of the belt, while the threaded portion 52 of the second threaded plug 50 threads into the wall of the second end of the belt. Since the first and second threaded plugs are threaded in opposing hands (i.e. the first threads are right hand and the second threads are left hand or vice versa), as the threaded portions thread into the ends of the belt, the opposing threads pull the ends of the belt together. The belt connector 30 is continuously rotated until the first end 15 is draw into abutment with the second end 20 of the belt 10. Once the first and second ends are in abutment, the belt connector 30 is completely sealed within the interior of the belt and the belt forms an endless loop.

Figure 3:
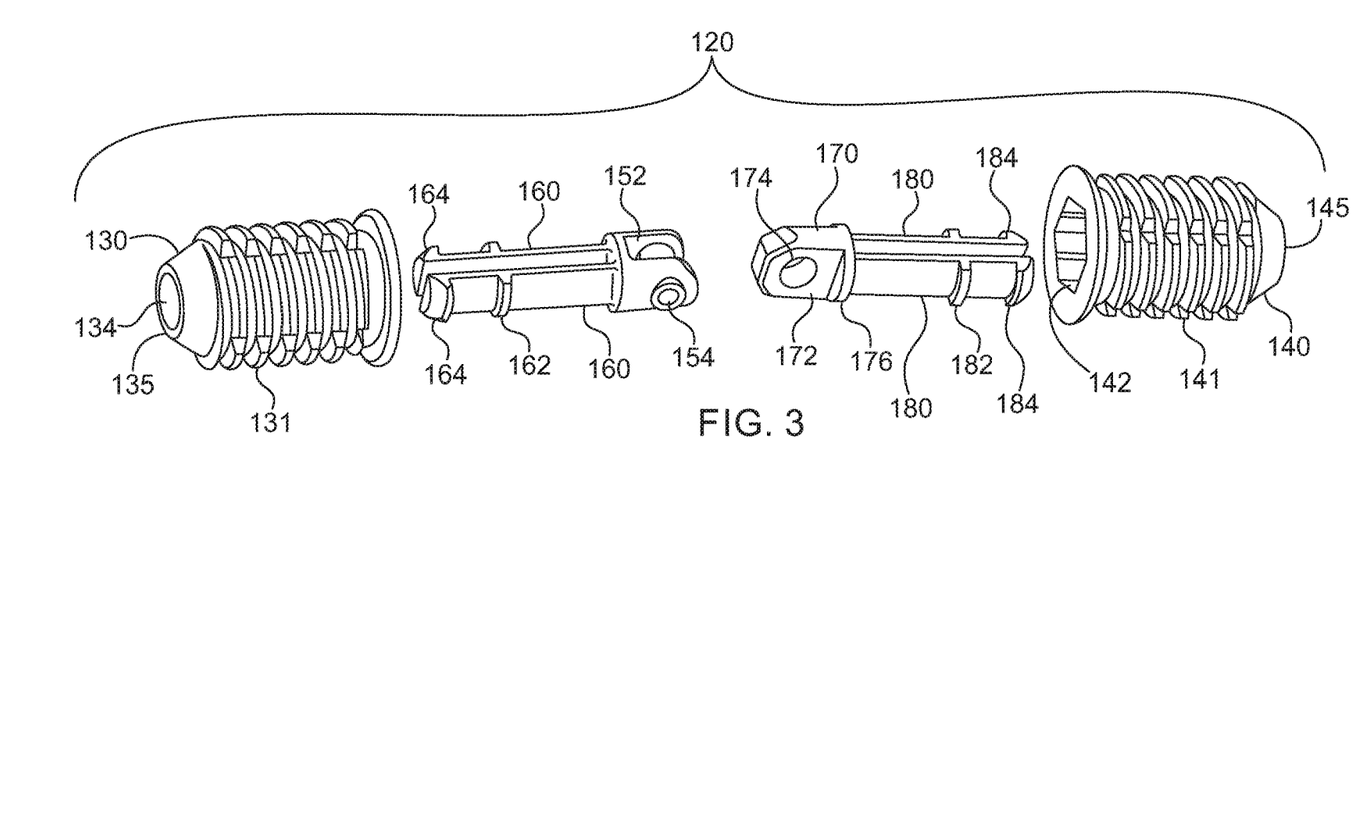
FIG. 3 is an exploded perspective view of an alternate belt connector.
Figure 4:
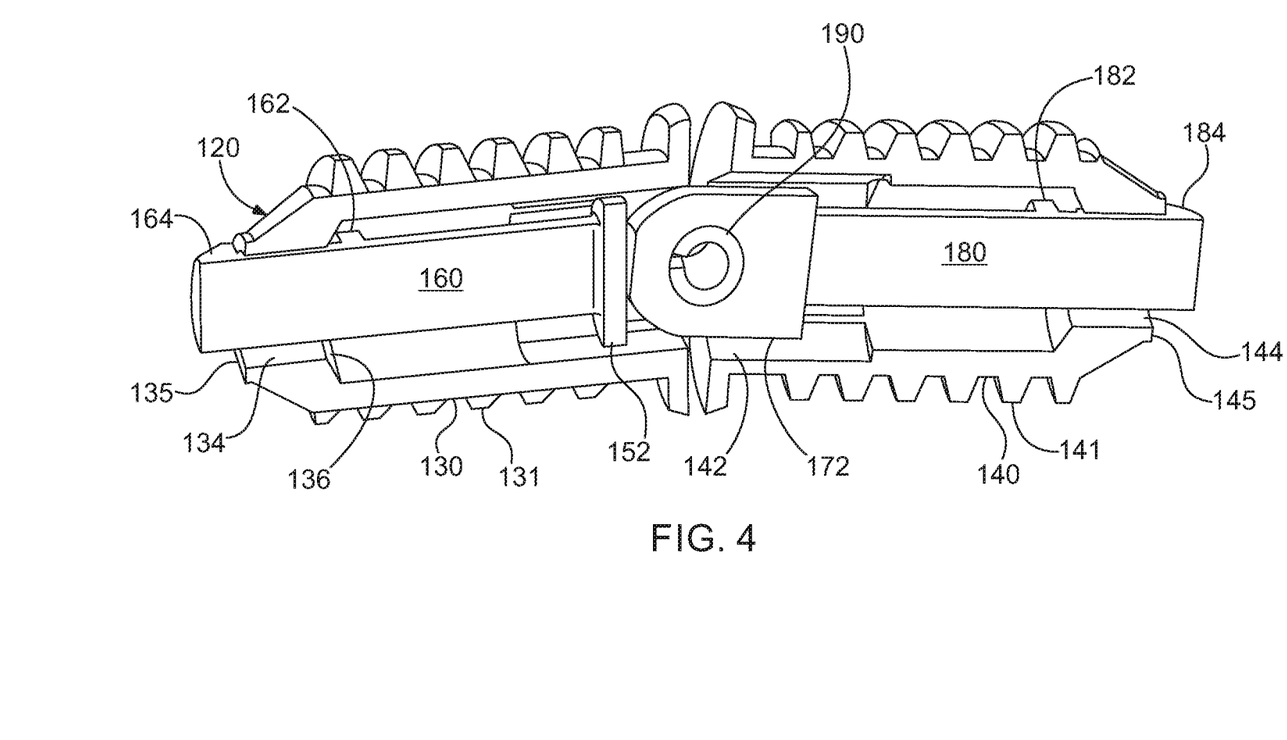
FIG. 4 is a sectional view of the belt connector illustrated in FIG. 3.
Figure 5:
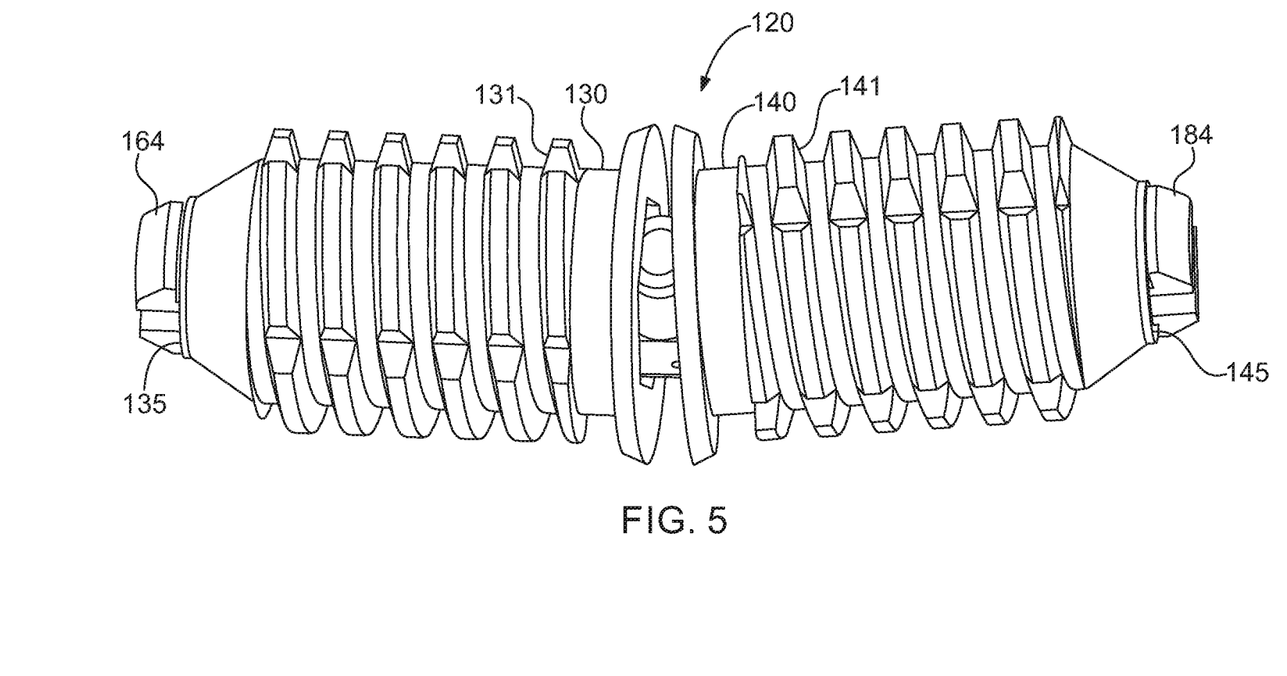
FIG. 5 is a perspective view of the belt connector illustrated in FIG. 4.

Referring now to FIGS. 3-5 an alternate belt connector is illustrated. The alternate belt connector is designated 120, and it includes a pair of opposing sockets 130, 140 that are threaded into ends of the belt. A pair of connecting pins 150, 170 are pivotably connected to one another and are adapted to connect the first and second threaded sockets 140, 150.

Referring to FIGS. 3-4, the first threaded socket 130 is a generally hollow cylindrical element. External threads are formed on the exterior surface of the first threaded socket. The external threads are configured similarly to the external threads of the threaded plug 40 described above. The first threaded socket 130 includes a central opening 132 at a rearward end of the socket that opens into the hollow interior of the socket. The forward end of the socket tapers inwardly to form a reduced diameter opening 134 through the forward end of the socket. The outer surface of the forward end forms a rim 135 around the forward opening. An interior shoulder 136 is formed within the interior of the socket 130. The shoulder 136 is spaced apart from the rim 135 adjacent the forward opening 134.

The second threaded socket 140 is configured substantially similarly to the first threaded socket 130. Specifically, the second threaded socket 140 includes threads 141 formed on the exterior of the socket, a central opening 142 at a rearward end of the socket and a reduced diameter opening 144 at the forward end of the socket. A rim 145 or lip extends around the exterior of the forward opening and an interior shoulder 146 is formed within the socket, spaced apart from the rim.

The exterior threads 141 on the second threaded socket are configured similarly to the exterior threads 131 of the first threaded socket 130. However, the exterior threads of the second socket are threaded with the opposite hand threads of the exterior threads 131 of the first threaded socket 130.

The connector 120 includes a pair of connecting pins 150, 160 that interconnect the first and second threaded connectors 130, 140. The pins may be configured to be connected in a variety of orientations. In a first orientation, the connecting pins are pivotably connected to one another about a single pivot axis. In a second configuration, the connecting pins are connected in a manner that permits the pins to pivot relative to one another about two transverse axes. In a third configuration, the connecting pins are connected in a manner that permits the pins to pivot universally relative to one another.

In the present instance, the connecting pins 150, 170 are pivotably connected so that the connecting pins are pivotable about a single axis. The first connecting pin 150 comprises a central hub 152. Two fingers 160 extend axially from the central hub. The fingers are axially elongated and radially flexible. The fingers 160 are spaced apart from one another so that a slot is formed between the two fingers. The slot forms a clearance space so that the fingers 160 can be deformed radially inwardly toward one another.

The terminal end of each finger 160 forms a hook or latch 164. In particular, the latch projects radially outwardly from the end of the finger 160 so that the outer diameter of the latch 164 is greater than the outer diameter of the finger 160. The forward tip of the latch 164 forms a tapered surface that operates as a ramp to facilitate insertion of the fingers 160 into the socket as discussed further below. The rearward edge of each latch 164 may be generally perpendicular to form a stop that engages the rim 135 of the opening 134 as described below. However, in the present instance, the rearward edge of the latch forms an undercut (i.e. the angle between the rearward edge and the side of the finger is less than 90 degrees). Increasing the amount of undercut may improve the retention between the latches 164 and the rim. However, increasing the undercut also increases the stress concentration on the latches that can cause the latch to fracture. Accordingly, it is desirable to limit the undercut to 1-10 degrees and in one example, the undercut may be 5 degrees to that the angle between the latch and the finger is approximately 85 degrees.

Each finger may also include a flange 162 projecting radially outwardly from the surface of the finger. The flange may be spaced rearwardly from the latch 164 so that the flange is spaced axially from the latch.

The hub 152 of the first connecting pin forms a connector for connecting the first and second connecting pins 150, 170. In the present instance, the central hub 152 forms a yoke having a through hole 154 forming a pivot axis for a pivot pin or hinge pin 190 that connects the two connecting pins. Additionally, the outer diameter of the central hub 152 of the connecting pin may have a diameter corresponding to the interior diameter of the threaded socket 130.

The second connecting pin 170 is configured substantially similarly to the first connecting pin 150. In particular, the second connecting pin comprises two parallel axially elongated flexible fingers 180, each having a hook or latch 184 at a terminal end and a radially extending flange 182 spaced apart from the latch. The central hub of the second connecting pin forms a flat tongue 172 having a thickness configured to fit in the slot of the yoke of the first connecting pin. An aperture or opening 174 extends through the thickness of the tongue 172. Additionally, a flange 176 projects radially outwardly from the tongue 172 and the flange is spaced from the rearward end of the second connecting pin. The flange 176 has an outer diameter corresponding to the inner diameter of the second threaded socket.

Configured as described above, the belt connector 130 can be used to connect the ends of a belt 10 as follows. The connecting pins may be connected to one another and then connected with the threaded sockets 130, 140 prior to engaging the belt. However, in the present instance, the connecting pins are designed so that each threaded socket 130, 140 can be partially or completely threaded into an end of the belt. After the sockets are inserted into the ends of the belt, the connecting pins can be connected to the threaded sockets.

More specifically, the first threaded socket 130 may be threaded into the first end 15 of the belt so that substantially the entire length of the first threaded socket is disposed within the hollow bore 12 of the belt such that the threads of the first threaded socket engage the wall of the belt. For example, the threads may bite or cut into the wall of the belt. The threads of the threaded socket may be any of a variety of thread types as discussed above in connection with the threaded inserts 40, 50 described above. Accordingly, the external threads of the socket 130 may be similar to the threads discussed above in connection with threaded inserts 40, 50.

To facilitate twisting the threaded socket, the interior bore of the socket may have a non-circular cross-sectional opening 132. For instance, the opening 132 may have a hexagonal opening so that a hex wrench can be inserted into the socket to facilitate rotation of the socket relative to the belt to thread the socket into the end of the belt. Similarly, the second threaded socket 140 may be threaded into the second end 20 of the belt.

After the threaded sockets 130, 140 are threaded into the ends 15, 20 of the belt 10, the connecting pins 150, 170 may be connected to the sockets. The connecting pins may be connected by a variety of connectors. In the present instance, the tongue 172 of the second connecting pin 170 is inserted into the yoke of the first connecting pin 150 and a hinge pin is inserted into the aligned holes 154, 174 through the first and second connectors. Preferably, the first and second connecting pins 150, 170 are connected to one another before the connecting pins are connected to the threaded sockets 130, 140.

After the connecting pins 150, 170 are connected to one another, each connecting pin is inserted into the respective threaded socket. Specifically, the first connecting pin is connected to the first threaded socket 130 by inserting the first connecting pin into the central opening 132 of the first socket. The connecting pin is advanced into the socket, driving the latches 164 at the forward end of the finger 160 toward the forward opening 134. Since the forward opening is a reduced diameter opening, the angled surfaces of the forward tip of the fingers 160 engage the forward opening, which deflects the fingers radially inwardly toward one another as the fingers are advanced into the forward opening. The fingers are preferably resiliently deformable so that when the tip of the fingers project through the forward opening 134, the fingers 160 expand or displace radially outwardly so that the outer radial edges of the latches extend radially outwardly beyond the rim 135 of the forward aperture. In this way, the latches 164 latch onto the forward end of the threaded socket, so that the latches cooperate with the socket to impede rearward displacement of the connecting pin relative to the socket. Additionally, the flange 162 adjacent the forward end of the fingers engages the shoulder 136 at the forward end of the interior of the socket. The flange 162 cooperates with the shoulder 136 to impede forward displacement of the connecting pin 150 relative to the threaded socket. Additionally, the outer diameter of the central hub 152 of the connecting pin 150 is sized to cooperate with the interior bore of the threaded socket. In this way, the central bore impedes substantial radial displacement of the connecting pin relative to the threaded socket.

The second connecting pin 170 snaps into the second threaded socket 140 similar to how the first connecting pin 150 snaps into the first threaded socket 130 as described above. In this way, the two connecting pins snap into the two threaded connectors 130, 140 to connect the two threaded connectors, thereby connecting the ends of the belt.

Figure 6:
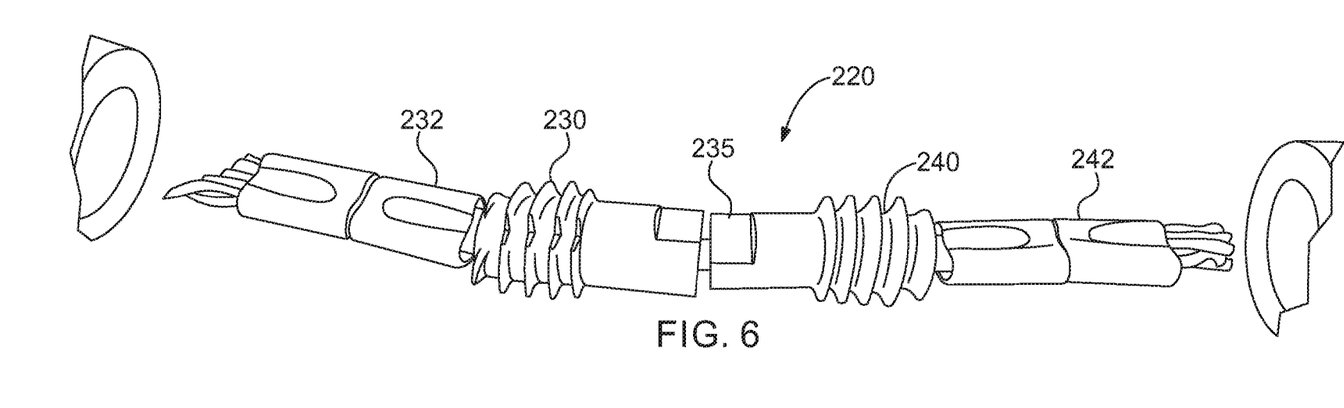
FIG. 6 is a perspective view of a second alternate belt connector.

Referring now to FIG. 6, another alternate embodiment of a belt connector 230 is illustrated. The belt connector 220 includes a connection that allows movement in more than two pivot axes; it allows universal movement similar to a universal joint connection. The belt connector includes two threaded inserts 230, 240. Like the threaded sockets 130, 140 of the previous embodiment, the threaded inserts 230, 240 have a through bore and external threads configured to engage the interior of the belt as discussed in the embodiments above. The first threaded insert 230 is connected with the second threaded insert in a manner that facilitates universal relative motion. For instance, the threaded inserts 230, 240 may be connected by a connector 260 that can flex and twist. Additionally, the connector 260 provides a connection that does not constrain movement about one or more axes. However, the connector does impede axial displacement between the two threaded inserts. One such exemplary connector 260 is a cord formed of a plurality of filaments. For instance, the connector 260 may be a thermoplastic multifilament yarn spun. As example of such a yarn is a cord formed from a liquid crystal polymer fiber sold under the name VECTRAN by Vectran Fiber, Inc. Similarly, the connector may be a polyester rope or metal cable.

The connector 260 extends through both of the threaded inserts 230, 240 so that the ends of the connector project out the ends of the threaded inserts. The ends of the connector 260 are then anchored to fix each end of the connector to the respective threaded insert. For instance, as shown in FIG. 6, ferrules 232, 242 or rings are crimped onto the ends of the cord 260. The ferrules 232, 242 act as stops preventing the cord from being pulled out of the threaded inserts 230, 240.

Figure 7:
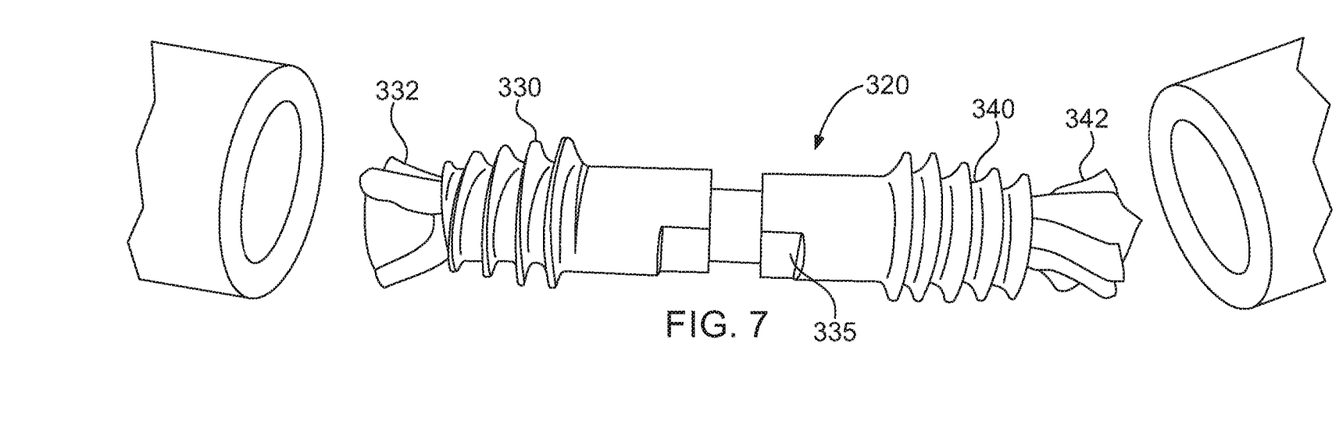
FIG. 7 is a perspective view of a third alternate belt connector.

An alternative connector is shown in FIG. 7. The belt connector 320 in FIG. 7 is substantially similar to the belt connector shown in FIG. 6, but the connecting cord 360 is attached to the threaded inserts 330, 340 in a different manner. Instead of a fastener being attached to the ends of the cord, the filaments of the cord are potted into a volume of epoxy or other adhesive forming a block 332, 334 of material that is larger in diameter than the opening in the end of threaded inserts 330, 340. In this way, the block of material with the embedded fibers prevents the cord from being pulled out of the threaded inserts.

The threaded inserts for both belt connectors 220, 320 include flats 235, 335 formed on the inner ends of the threaded inserts. In particular, each belt connector may include a plurality of flat surfaces 235, 335 circumferentially spaced apart around the threaded inserts to provide surfaces for engaging a tightening tool, such as a wrench.

As described above, the connectors 220, 320 allow a universal connection since the cord is not limited to flexing, pivoting or twisting motion about a particular axis. Instead, the first threaded insert 230, 330 can freely move radially relative to the corresponding second threaded insert 240, 340. However, the cord 260, 360 prevents axial displacement of the first threaded insert 230, 330 relative to the second threaded insert. Specifically, the cord 260, 360 supports a tensile force that would tend to pull the threaded inserts apart, which would in turn allow the ends of the belt to come apart.

It will be recognized by those skilled in the art that changes or modifications may be made to the above-described embodiments without departing from the broad inventive concepts of the invention. For instance, in the above description, the belt connectors use exterior threads to connect the belt connectors with the hollow bore of the belt 10. However, in certain applications it may be possible and/or desirable to utilize a different exterior engagement surface, such as a barbed connector. In either instance, the exterior engagement surface incorporates a radially extending surface having an acutely angled surface operable to bite or cut into the wall of the belt to positively engage the belt. It should therefore be understood that this invention is not limited to the particular embodiments described herein, but is intended to include all changes and modifications that are within the scope and spirit of the invention as set forth in the claims.

What is claimed is:
1. An endless belt, comprising:
an elongated length of belt material having a first end having an opening and a second end having an opening; and
a belt connector configured to connect the first end of belt material with the second end of the belt material to create a continuous loop, wherein the connector comprises:
a first connector having an exterior surface configured to cooperate with an interior surface of the first end opening;
a second connector having an exterior surface configured to cooperate with an interior surface of the second end opening; and
a connecting link connecting the first connector with the second connector;
wherein the connecting link is pivotable relative to the first connector about a first axis and the connecting link is pivotable relative to the second connector about a second axis that is transverse the first axis;
wherein the exterior surface of the first connector comprises exterior threads configured to positively engage an interior wall of the elongated length of belt;
wherein the exterior surface of the second connector comprises exterior threads configured to positively engage an interior wall of the elongated length of belt and where in the exterior threads of the second connector are the opposite hand threads of the exterior threads of the first connector; and
wherein the first connector comprises a first pair of spaced apart arms projecting rearwardly from the exterior threads wherein the first pair of arms form a first yoke fixedly connected with the exterior threads and wherein the second connector comprises a second pair of spaced apart arms projecting rearwardly from the exterior threads of the second connector wherein the second pair of arms form a second yoke fixedly connected with the exterior threads of the second connector.

2. The endless belt of claim 1 wherein the exterior threads comprise self-tapping threads.

3. The endless belt of claim 1 wherein the exterior threads of the first and second connectors are configured so that rotation of the belt connector relative to the length of belt material operates to pull the first and second ends toward one another.

4. The endless belt of claim 1 wherein the connecting link comprises an engagement surface for engagement with a tool, wherein the tool is operable to rotate the belt connector relative to the length of belt to tighten the belt connector.

5. The endless belt of claim 1 wherein the exterior threads have a thread angle greater than or equal to 35 degrees and less than or equal to 60 degrees.

6. The endless belt of claim 5 wherein the exterior threads have a thread angle of greater than or equal to 40 degrees and less than or equal to 50 degrees.

7. The endless belt of claim 1 wherein the first connector comprises one of a tongue and a yoke and the connecting link comprises the other of the tongue and the yoke, wherein the tongue and the yoke are configured to mate to provide a connection that allows relative motion about a single axis while impeding axial displacement or displacement about an axis transverse the single axis.

8. The endless belt of claim 1 wherein the entire belt connector is completely enclosed within the belt material.

9. The endless belt of claim 1 wherein the connecting link comprises a first tongue projecting into the first yoke of the first connector and a second tongue projecting into the second yoke of the second connector.

10. The endless belt of claim 9 wherein the connecting link comprises a first protrusion fixedly connected with the first tongue and protruding from the first tongue to engage the first yoke and a second protrusion fixedly connected with the second tongue and protruding from the second tongue to engage the second yoke.

11. A belt connector for connecting a first end of a length of belt material with a second end of the length of belt material to create a continuous loop, wherein the length of belt material has a first interior cavity at the first end and a second interior cavity at the second end, wherein the belt connector comprises:
   a first connector having an exterior surface configured to cooperate with an interior surface of the first end cavity;
   a second connector having an exterior surface configured to cooperate with an interior surface of the second end cavity;
   a connecting link connecting the first connector with the second connector;
   wherein the connecting link is pivotable relative to the first connector about a first axis and the connecting link is pivotable relative to the second connector about a second axis that is transverse the first axis;
   wherein the exterior surface of the first connector comprises exterior threads configured to positively engage an interior wall of the elongated length of belt;
   wherein the exterior surface of the second connector comprises exterior threads configured to positively engage an interior wall of the elongated length of belt and wherein the exterior threads of the second connector are the opposite hand threads of the exterior threads of the first connector; and
   wherein the first connector comprises a first pair of spaced apart arms projecting rearwardly from the exterior threads wherein the first pair of arms form a first yoke fixedly connected with the exterior threads and wherein the second connector comprises a second pair of spaced apart arms projecting rearwardly from the exterior threads of the second connector wherein the second pair of arms form a second yoke fixedly connected with the exterior threads of the second connector.

12. The endless belt of claim 11 wherein the connecting link comprises a first tongue projecting into the first yoke of the first connector and a second tongue projecting into the second yoke of the second connector.

13. The belt connector of claim 11 wherein the exterior threads comprise self-tapping threads.

14. The endless belt of claim 12 wherein the connecting link comprises a first protrusion fixedly connected with the first tongue and protruding from the first tongue to engage the first yoke and a second protrusion fixedly connected with the second tongue and protruding from the second tongue to engage the second yoke.

15. The belt connector of claim 11 wherein the exterior threads of the first and second connectors are configured so that rotation of the belt connector relative to the length of belt material operates to pull the first and second ends toward one another.

16. The belt connector of claim 11 wherein the connecting link comprises an engagement surface for engagement with a tool, wherein the tool is operable to rotate the belt connector relative to the length of belt to tighten the belt connector.

17. The belt connector of claim 11 wherein the exterior threads have a thread angle of greater than or equal to 35 degrees and less than or equal to 60 degrees.

18. The belt connector of claim 17 wherein the exterior threads have a thread angle of greater than or equal to 40 degrees and less than or equal to 50 degrees.

19. The belt connector of claim 11 wherein the first connector comprises one of a tongue and a yoke and the connecting link comprises the other of the tongue and the yoke, wherein the tongue and the yoke are configured to mate to provide a connection that allows relative motion about a single axis while impeding axial displacement or displacement about an axis transverse the single axis.

20. A method for connecting a length of belt material using a belt connector to form a belt, wherein the belt connector includes a first connector, a second connector and a connecting link connecting the first and second connectors, wherein the method comprises the steps of:
   inserting the first connector into a first cavity in a first end of the belt material;
   inserting the second connector into a second cavity in a second end of the belt material;
   immobilizing the first connector relative to the second connector to impede relative motion of the first connector relative to the second connector after the steps of inserting the first connector and inserting the second connector;
   rotating the first and second connectors about an axis while the first connector is in the first cavity and the second connector is in the second cavity;
   wherein the first and second connectors are configured to engage the interior of the belt material so that the step of rotating the first and second connectors operates to connect the first and second ends of the belt material and draw together the first and second ends.

21. The method of claim 20 wherein the first and second connectors comprise external threads and the step of rotating operates to thread the first and second connectors into the belt material.

22. The method of claim 20 wherein the first connector is pivotable relative to the connecting link about a first axis and the second connector is pivotable relative to the connecting link about a second axis transverse the first axis, wherein the step of immobilizing comprises immobilizing the first and second connectors to impede relative pivoting movement between the first and second connectors and the connecting link.

23. The method of claim 22 wherein the step of immobilizing comprises clamping the first connector and the connecting link and the method comprises the step of releasing the clamp to permit pivoting movement of the first connector relative to the connecting link and pivoting movement of the second connector relative to the connecting link after the first and second ends of the belt material are connected.

24. The method of claim 2 comprising the step of positioning the endless belt around two or more rotatable elements.

25. The method of claim 20 wherein the rotatable elements are pulleys or rollers.

26. The method of claim 24 wherein the step of positioning is performed prior to the step of rotating.

* * * * *

UNITED STATES PATENT AND TRADEMARK OFFICE
CERTIFICATE OF CORRECTION

PATENT NO. : 10,214,359 B2
APPLICATION NO. : 15/445341
DATED : February 26, 2019
INVENTOR(S) : Sunil Ramachandra

Page 1 of 1

It is certified that error appears in the above-identified patent and that said Letters Patent is hereby corrected as shown below:

In the Claims

Column 14, Line 65, Claim 24, "The method of claim 2" should read -- The method of claim 20 --.

Signed and Sealed this
Sixteenth Day of April, 2019

Andrei Iancu
*Director of the United States Patent and Trademark Office*